United States Patent Office 3,488,796
Patented Jan. 13, 1970

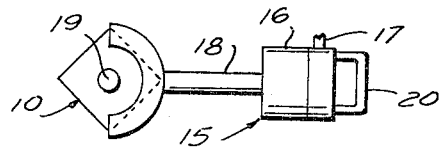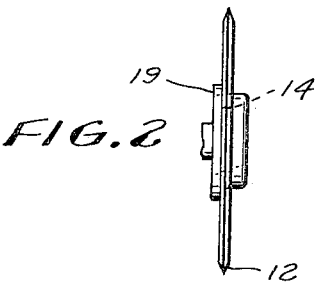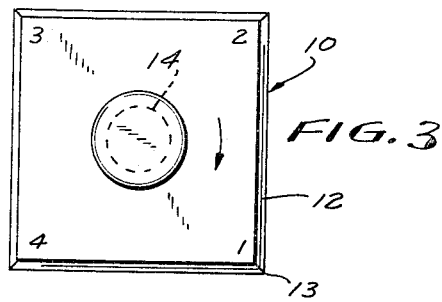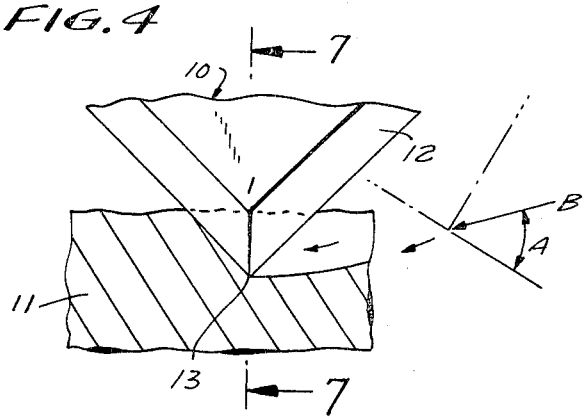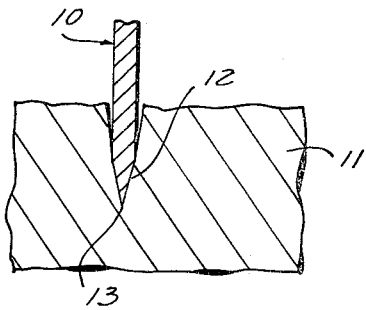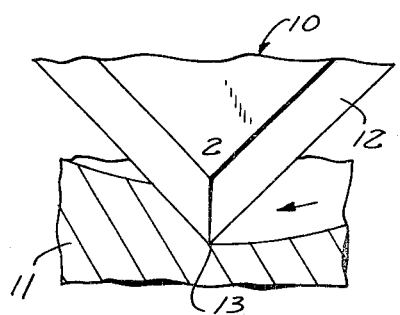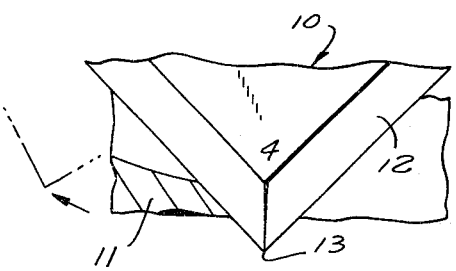

3,488,796
POLYGONALLY SHAPED ROTARY
CUTTING BLADE
Raymond L. Johnson, Rochester, N.Y., assignor to Tobin
 Packing Company, Incorporated, Rochester, N.Y., a
 corporation of Delaware
Filed July 19, 1967, Ser. No. 654,515
Int. Cl. A01d 55/18; A22b 5/20; B26b 9/02
U.S. Cl. 17—23                                         1 Claim

ABSTRACT OF THE DISCLOSURE

A rotary cutting blade for use in splitting an animal carcass with a chopping action and with a minimum of sustained friction consisting of a flat thin sheet of hard metal in the form of an equilateral, equiangular, symmetrical polygon having no more than four sides which are straight and beveled to provide a plurality of straight cutting edges and with adjacent cutting edges meeting at sharpened corners.

BACKGROUND OF THE INVENTION

The following invention relates to a cutting blade for efficiently splitting and opening the carcass of an animal, such as a hog. Formerly, the carcass was split and opened through the use of a large hand cleaver which was designed to hack down through the back bone of the animal. While this method was satisfactory, the use of an electrically driven circular saw has now generally supplanted the manual procedure. The electric saw has permitted the more rapid handling of the animal carcasses with a concomitant increase in production. However, its use has also introduced objectionable disadvantages which were not found when the manual splitting operation was employed. In particular, the circular saw blade often discolors the bone being cut due to the sustained frictional engagement between the carcass and the blade which rotates at high speed. This discoloration is highly objectionable to retailers and consumers alike. Further, the circular cutting blade often creates an excessive amount of bone dust resulting from the sawing action.

SUMMARY OF THE INVENTION

In a broad sense, the present invention is directed to a rotary cutting blade comprising a flat thin sheet of hard metal in the form of a regular polygon having no more than four sides. The sides of the blade are beveled to provide a plurality of straight cutting edges with adjacent edges meeting to form a sharpened corner. The blade is adapted to be mounted on the arbor of a prime mover of the type now commonly used with circular saws in the hog processing industry.

The primary object of the present invention is to permit the rapid processing of animal carcasses without the disadvantages inherent in the use of circular saws of known design. This object is accomplished through the use of the polygonally shaped rotary cutting blade herein described. Because of its unique configuration, cutting of the carcass is accomplished by an intermittant chopping rather than a sawing action. For this reason, and since only a portion of the blade is in contact with the carcass at any given time, friction is greatly reduced and bone dust is minimized.

An additional object of the present invention is to provide a cutting blade which can be made in any size, is reversible, has a number of beveled cutting edges, and can be easily designed to fit any arbor.

Further objects and advantages of the present invention will readily come to mind as the following description is developed.

BRIEF DESCRIPTION OF THE DRAWING

Referring to the drawing:
FIG. 1 is a view of a rotary blade embodying the invention mounted on a prime mover of well-known design;
FIG. 2 is a front view of the blade;
FIG. 3 is a side view of the blade;
FIGS. 4 through 6 are side views illustrating the manner in which the blade progressively chops through the carcass of an animal;
FIG. 7 is a cross-sectional view on the line 7—7 of FIG. 4.

DESCRIPTION OF THE PREFERRED EMBODIMENT

Referring to the figures of the drawing, the present invention is directed to a rotary cutting blade 10 for splitting the carcass of an animal 11. In the preferred embodiment, the blade comprises a flat thin sheet of hard metal, the peripheral edge of which is in the form of an equilateral, equiangular, symmetrical polygon having four sides. The sides are beveled, as at 12, on both flat surfaces along their entire length to provide four sharp, straight cutting edges, with the adjacent edges meeting to form four sharpened points or corners 13.

The blade has a central opening 14 which is designed for mounting on the arbor of a prime mover 15 of the type now commonly used with circular saws in the hog processing industry. As illustrated, the prime mover 15 includes an electric motor 16, a supporting cable 17, a drive shaft 18, a suitable arbor 19 for supporting and rotating the blade, and a handle 20 for guiding the blade by the operator. A prime mover of the type described is manufactured by The Best and Donovan Company of Cincinnati, Ohio.

Upon rotation of the blade, the cutting edges adjacent the intersection of the sides contact the carcass with an intermittent chopping action rather than a sawing action. This chopping action is illustrated in FIGURES 4 through 6 which show the manner in which the cutting edges (numbered 1 through 4) progressively enter the carcass. As can be readily seen, the cutting edges of the blade initially approach the carcass at a relatively large angle of incidence or attack. This angle is shown in FIGURE 4 to be the angle A between the direction of travel B of a particular point on the edge and the edge itself. In a pure chopping action the angle would approach 90° while in a sawing action the angle would approach 0°.

The resulting intermittent chopping action results in significant advantages over the slicing or sawing action of a circular saw. In particular, since the cutting edge does not slice across the body of the carcass, and since only a portion of the blade is in contact with the carcass at any given time, the heat of friction is greatly reduced and bone dust is minimized. These advantages in turn result in a finer appearance of the finished product.

The blade may be manufactured from any suitable hard metallic material, however, stainless steel is preferred. While the blade is illustrated as having four sides, a triangular blade may be employed with equally satisfactory results. It has been found however, that a blade having more than four sides has an insufficient angle of attack to produce a significant advantage over a circular blade. The invention is therefore limited to a blade having not more than four sides.

From the foregoing, it is apparent that the object and advantages of the present invention are uniquely out. While the previous discussion is directed to a preferred embodiment of the present invention, this discussion is presented by way of example, not by way of limitation, for it is apparent that one skilled in the art will readily realize that various modifications may be made to the

I claim:

1. A rotary cutting appliance for use in splitting the carcass of an animal with a chopping action and in a manner to minimize sustained friction, said appliance comprising:

a square cutting blade in the form of a flat thin sheet of hard metal, the sides of said blade being straight and beveled for their entire length to provide four sharp, straight cutting edges, said four edges being coplanar with adjacent edges meeting at sharpened corners, said blade having a central opening therethrough, and a prime mover having an arbor fixedly mounted in said central opening to support said blade, said prime mover further including means for rotating said arbor and said blade, whereby rotation of said blade causes the cutting edges to engage the carcass at a relatively large angle of attack, thereby producing an intermittent chopping action.

References Cited

UNITED STATES PATENTS

| | | | |
|---|---|---|---|
| 999,501 | 8/1911 | Karhan | 17—23 |
| 1,876,075 | 9/1932 | Reichert et al. | 30—347 X |
| 1,876,072 | 2/1937 | Cockburn | 56—25.4 |
| 2,740,249 | 4/1956 | Stearns | 56—295 |
| 3,160,184 | 12/1964 | Frate et al. | 146—123 |

LUCIE H. LAUDENSLAGER, Primary Examiner

U.S. Cl. X.R.

30—347; 146—123